United States Patent [19]

Turner

[11] Patent Number: 5,186,481
[45] Date of Patent: Feb. 16, 1993

[54] BICYCLE WITH IMPROVED FRONT FORK WHEEL SUSPENSION

[75] Inventor: Paul H. Turner, Boulder, Colo.

[73] Assignee: Rockshox, Inc., Fletcher, N.C.

[21] Appl. No.: 680,140

[22] Filed: Apr. 3, 1991

[51] Int. Cl.⁵ .............................................. B62K 25/08
[52] U.S. Cl. ................... 280/276; 188/24.19;
   188/269; 267/217; 267/226; 280/279; 280/710
[58] Field of Search ............................. 188/24.19, 269;
   280/276, 710, 279; 267/217, 226

[56] References Cited

U.S. PATENT DOCUMENTS

| 4,807,860 | 2/1989 | Simons | 280/276 |
| 4,971,344 | 11/1990 | Turner | 280/276 |

FOREIGN PATENT DOCUMENTS

| 0245221 | 11/1987 | European Pat. Off. | |
| 420610 | 4/1991 | European Pat. Off. | 280/279 |
| 8168 | 10/1907 | France | 280/276 |
| 843817 | 4/1939 | France | 280/276 |
| 1036016 | 9/1953 | France | 280/276 |
| 1045138 | 9/1953 | France | |
| 1091192 | 10/1954 | France | 280/276 |
| 55-29609 | 3/1980 | Japan | |
| 299164 | 8/1954 | Switzerland | 280/276 |

OTHER PUBLICATIONS

Unknown "1954" publication, p. 180.

Primary Examiner—Mitchell J. Hill
Attorney, Agent, or Firm—Sixbey, Friedman, Leedom & Ferguson

[57] ABSTRACT

In accordance with a preferred embodiment, a front fork wheel suspension of a bicycle has two telescoping suspension assemblies, one on each leg of the front fork. Each of the suspension assemblies includes a pair of telescoping tubes having a hydraulic fluid and an air-space therein, as well as a spring-loaded valve which regulates the flow of hydraulic fluid between the two tubes of the telescoping assembly. To control the point at which the assemblies change from a rigid, locked condition, in which the valve plate is closed, to a shock absorbing, telescopically displaceable condition, in which the valve plate is open, an adjustor rod is provided by which the degree of precompression of the valve spring can be changed. Furthermore, in order to improve the rigidity of the fork, the cross member interconnecting the lower tubes of the suspension assemblies has a compound cross-sectional shape which goes from circular cross section at a U-bend portion into a rectangular cross section at straight, leg portions thereof.

21 Claims, 5 Drawing Sheets

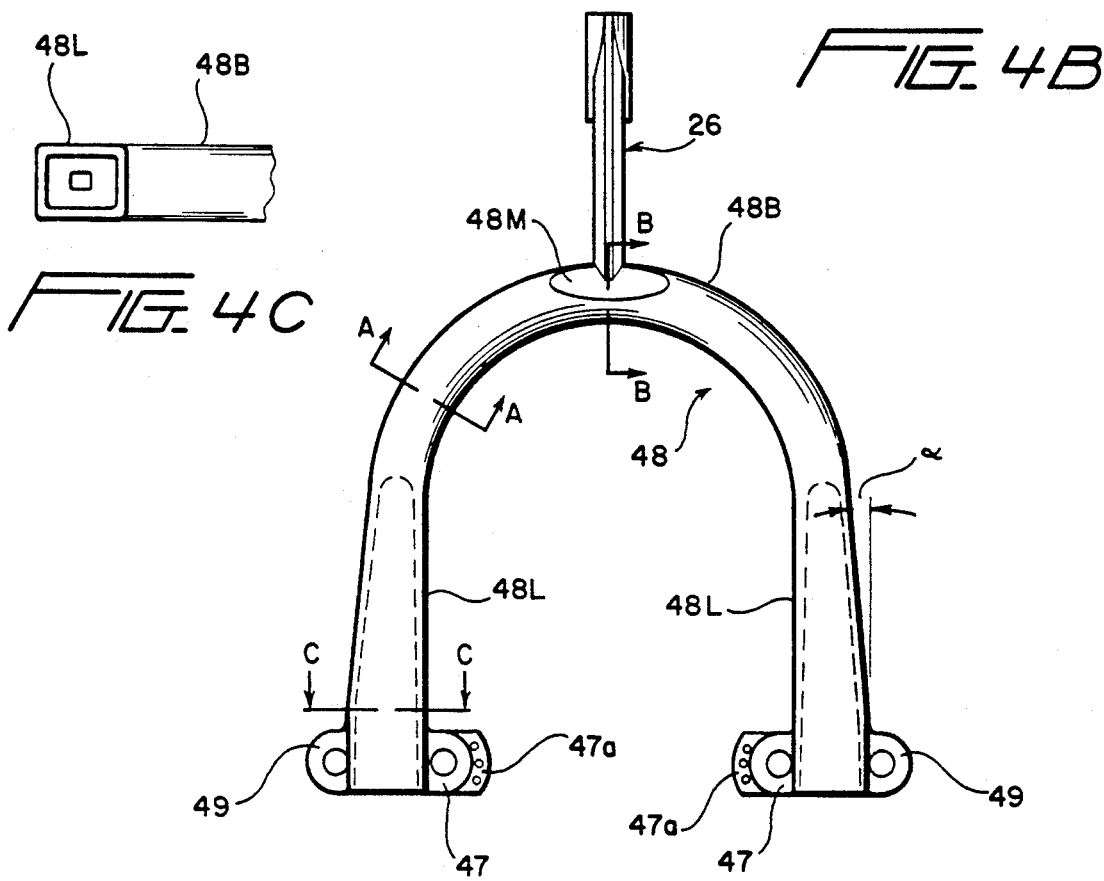
FIG. 4A
FIG. 4B
FIG. 4C
FIG. 4
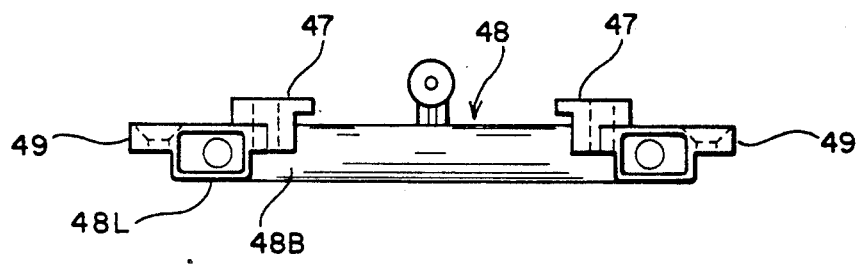
FIG. 5

BICYCLE WITH IMPROVED FRONT FORK WHEEL SUSPENSION

BACKGROUND OF THE INVENTION

1. Field of the Invention

The present invention relates to bicycles having a front fork wheel suspension. More particularly, the present invention is directed to improvements which will enable a bicycle front fork wheel suspension to be more readily adapted to the needs of a wider variety of riders, and to modifications which are designed to improve handling characteristics of bicycles having front fork wheel suspensions.

2. Description of Related Art

In the present inventor's U.S. Pat. No. 4,971,344, a bicycle having a telescopic suspension system for the front wheel is disclosed which allows the bicycle to perform in the manner of one having a standard, rigid front fork under normal riding conditions, so that the pedaling energy of the rider is not absorbed by the suspension system, yet it is also able to compress and absorb high input impact shocks as occur when the front wheel contacts pot holes, tree roots or rocks, etc. This characteristic is achieved through the use of a fluid-containing circuit that acts to lock the telescoping suspension assembly against compression by resisting low input forces imposed upon the fork, via handlebar and frame portions of the bicycle, as a result of a pedaling action of a rider of the bicycle, while enabling compression of the suspension assembly for absorption of impact shocks imposed upon the front fork by a wheel carried thereby by reacting under the effect of high input forces. In accordance with a preferred embodiment, the fluid-containing circuit includes a valve with a valve body having at least one flow port and a displaceable valve plate. The valve plate is spring loaded into a position in which it blocks fluid flow through the port, and which opens to permit fluid flow when the spring force on the plate is overcome.

In another aspect of the front fork wheel suspension of the applicant's earlier U.S. patent, a cross member interconnects the lower tube of each of a pair of telescoping suspension assemblies to limit twisting and rotating motion of the suspension assemblies. This cross member also serves to provide a brake cable stop which enables a front brake cable to float with the lower tubes of the telescoping assemblies. Additionally, a wheel rim brake is carried by the lower telescoping tubes in areas at which the cross member connects to the lower telescoping tubes so as to enable the rim brake to travel with the lower telescoping tubes.

While this front fork wheel suspension of the present inventor has proved to provide excellent performance (having been used by professional riders to win championships), and has been commercially successful, areas for further improvement have been noted. In particular, in this earlier suspension assembly, the spring force for the spring preloading of the valve plate was set to be correct for riders of average weight and riding ability, but was either too stiff or soft for riders who varied from the norm. To adjust the suspension for riders of different weight, the suspension system was pressurized with air through an air valve, and this air pressure could be altered to compensate for different rider weights or riding conditions. However, because the extension damping performance of the suspension is directly related to the amount of air pressure in the system, adjusting the air pressure to compensate for a rider's weight could adversely impact on the extension damping characteristics of the suspension.

Additionally, while the inverted U-shaped cross member was designed to resist the torsional forces placed on the fork between the handlebars and the front wheel, to limit twisting and rotation of the lower telescoping tubes, other forces acting on the fork were not taken into consideration. In particular, subsequent research and testing has shown that side loading forces are imposed during cornering or when the rider is climbing hills out of the saddle ("jamming"). These forces tend to cause the individual telescoping legs to move independently of each other, which can detract from the bicycle's handling characteristics.

SUMMARY OF THE INVENTION

In view of the foregoing, it is a general object of the present invention to further develop the bicycle front fork wheel suspension of the above-noted patent so as to render it more adaptable to a wider variety of riders, without affecting its extension damping characteristics, and to further strengthen its ability to resist the effects of outside forces which can adversely affect handling characteristics.

More specifically, it is an object of the present invention to provide a bicycle with a front fork wheel suspension which utilizes a hydraulic valve to control flow between tubes of a telescopic suspension assembly in which the opening characteristics of the valve are adjustable.

It is a further object of the present invention to provide a bicycle with a front fork wheel suspension which includes a cross member between the telescoping tubes which will increase fork stiffness, not only with respect to torsional forces, but also side loading forces.

These and other objects of the invention are achieved in accordance with a preferred embodiment of a front fork wheel suspension of a bicycle having two telescoping suspension assemblies, one on each leg of the front fork. Each of the suspension assemblies includes a pair of telescoping tubes having a hydraulic fluid and an airspace therein, as well as a spring-loaded valve which regulates the flow of hydraulic fluid between the two tubes of the telescoping assembly. To control the point at which the assemblies change from a rigid, locked condition, in which the valve plate is closed, to a shock absorbing, telescopically displaceable condition, in which the valve plate is open, an adjustor rod is provided by which the degree of precompression of the valve spring can be changed. Furthermore, in order to improve the rigidity of the fork, the cross member interconnecting the lower tubes of the suspension assemblies has a compound cross-sectional shape which goes from circular cross section at a U-bend portion into a rectangular cross section at straight, leg portions thereof.

The foregoing and other objects, features and advantages of the present invention will become apparent from the following Detailed Description of the Preferred Embodiment when considered in conjunction with the accompanying drawings.

BRIEF DESCRIPTION OF THE DRAWINGS

FIG. 4 is a rear elevational view of a cross member of the front fork illustrated in FIG. 2;

FIG. 4A is a cross-sectional view taken along line A—A in FIG. 4;

FIG. 4B is an enlarged cross-sectional view taken along line B—B in FIG. 4;

FIG. 4C is a cross-sectional view taken along line C—C in FIG. 4;

FIG. 5 is a bottom plan view of the cross member shown in FIG. 4;

DETAILED DESCRIPTION OF THE PREFERRED EMBODIMENT

Figure 1:
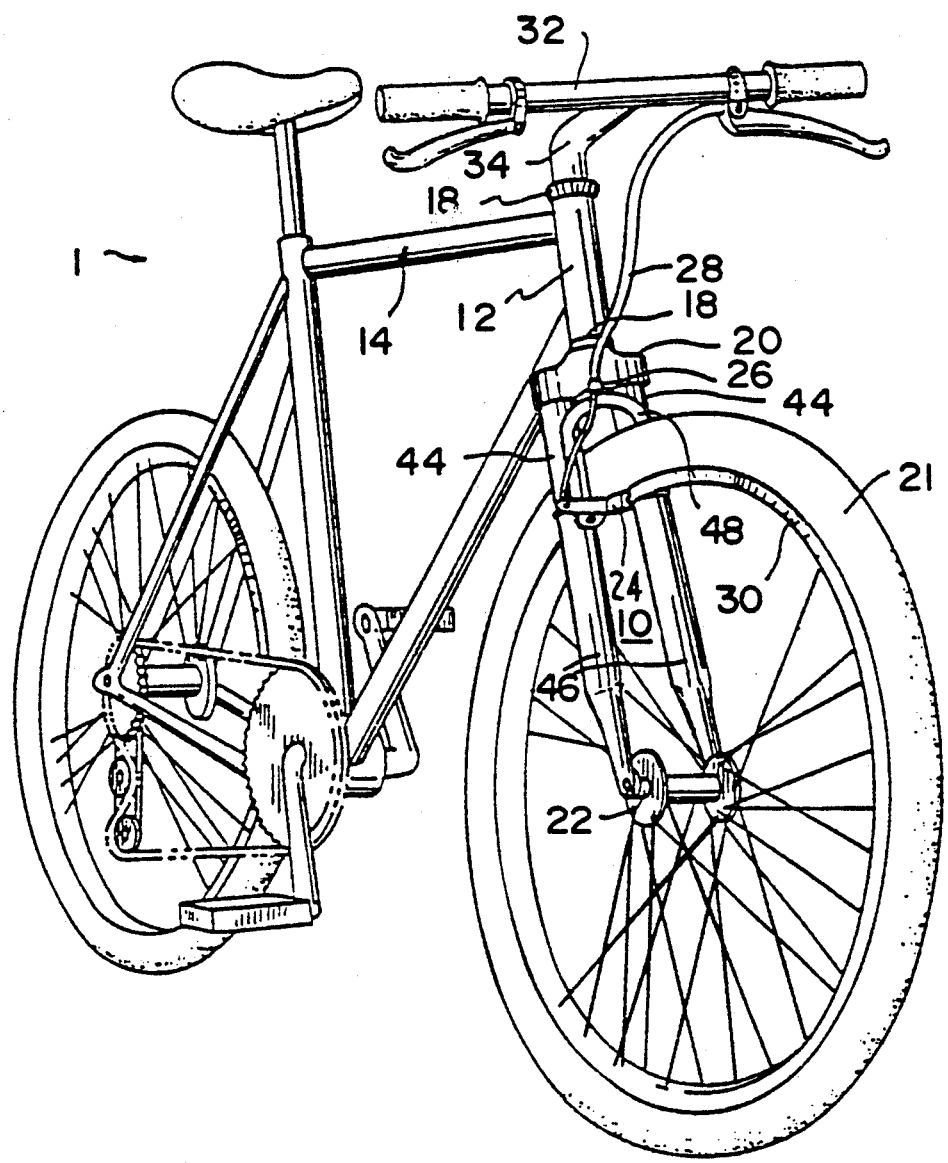
FIG. 1 is a view of a bicycle with a front fork wheel suspension in accordance with the present invention.

As already mentioned, this invention represents a further development of that disclosed in the applicant's U.S. Pat. No. 4,971,344. Thus, to facilitate an understanding of the present invention, the disclosure of that patent is hereby expressly incorporated by reference. Furthermore, in order to facilitate reference to said earlier patent, to as great an extent as possible, the parts described herein are identified by the same reference numerals utilized to identify corresponding parts in this earlier patent.

Figure 2:
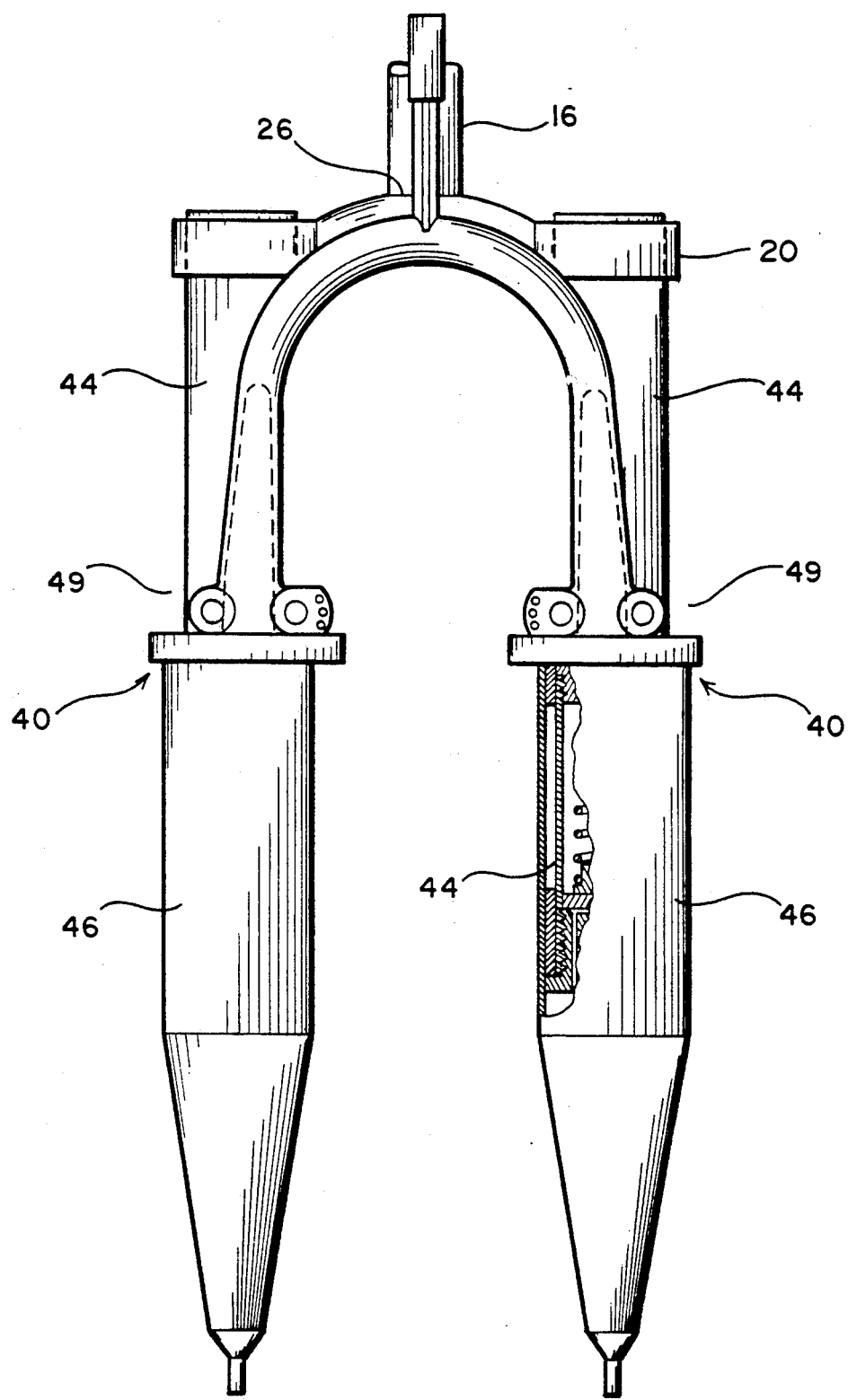
FIG. 2 is a front view of the front fork suspension in accordance with the present invention.

In FIG. 1, a bicycle 1 is shown having a conventional frame 14. The improved front fork suspension 10 (shown in greater detail in FIG. 2) of the present invention has a steering pipe 16 which is mounted within a head tube 12 of the bicycle frame 14 for rotation along a steering axis in a pair of rotational bearings 18, together with the extension stem 34 of a standard handlebar 32.

The steering pipe 16 of the front fork suspension 10 is secured in a single upper crown 20, which also clamps two telescoping suspension assemblies 40 at an off angle relative to the steering axis, so as to place the front wheel 21 forward of the line of the steering axis in what is known as a rake on a standard bicycle fork.

Each of the telescoping suspension assemblies 40 of the front fork 10 is comprised of an upper telescoping tube 44 and a lower sliding tube 46. The axle 22 of the front wheel 21 is mounted in the bottom end of lower tubes 46. Also, as will be described in greater detail below, a standard wheel rim friction type brake 24 is mounted to the lower sliding tubes 46 in the areas where a cross member 48 is secured. This cross member 48, which serves to strengthen the front fork wheel suspension 10, also carries a cable stop 26 for the front brake Bowden cable 28, thereby allowing the front brake cable 28 to float with the lower sliding tubes 46 as the rim brakes 24 move up and down in unison with the rim 30 of the front wheel 21.

Inasmuch as the two telescoping suspension assemblies 40 are identical, and since the lower telescoping tube is constructed in the manner shown and described in U.S. Pat. No. 4,971,344 and can slidingly receive the upper telescoping tube 44 in the manner disclosed therein, with or without the hydraulic extension lock arrangement provided therebetween, the following discussion of the suspension assemblies 40 will be limited to a description of the upper telescoping tube 44. In this regard, specific reference can be made to FIGS. 3 & 4 and the description thereof in this prior patent.

Figure 3:
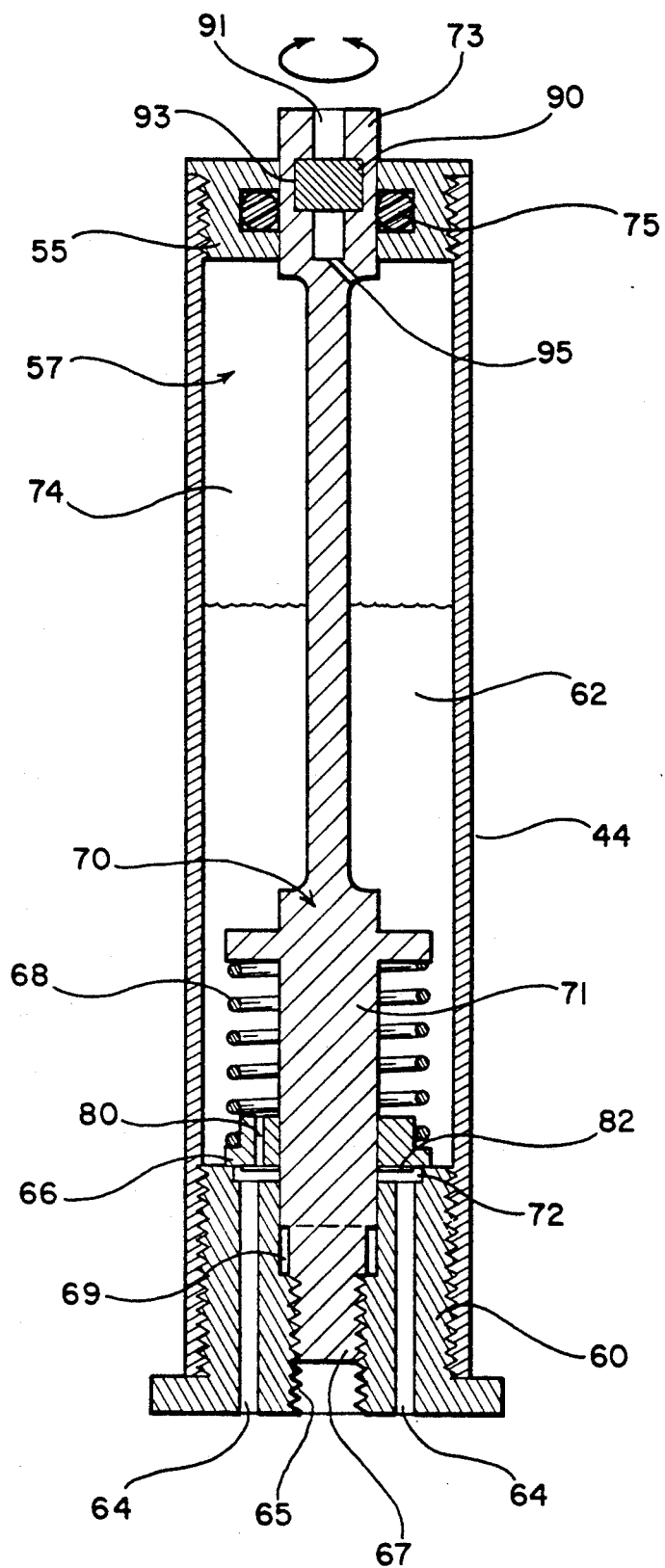
FIG. 3 is a cross-sectional side view of an upper telescoping tube for the telescoping suspension assembly of the front fork suspension of FIG. 2.
Figure 7A:
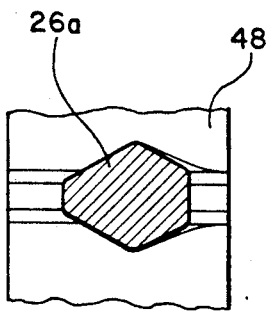
FIG. 7A is a cross-sectional view taken along line 7A—7A in FIG. 7.

In FIG. 3, upper telescoping tube 44 is shown as having a metering valve 60 threaded into its lower end for metering the flow of a viscous fluid medium 62 between the chamber 57 of the upper telescoping tube 44 and a similar chamber in a respective lower telescoping tube 46 during compression and extension of the suspension assembly 40. These chambers can be thought of as a single fluid chamber having a portion in each of the tubes with the metering valve 60 disposed therein to regulate flow of fluid between the portions of the chamber. To this end, the metering valve 60 is provided with ports 64 which extend through the body of the metering valve and open into a counterbore area 72 at their inner ends. A compression valve plate 66 is held in a closed position, covering the counterbore area 72, by a compression spring 68 that is held in place in a precompressed condition by an adjustment rod 70. The metering valve 60 has a threaded opening 65 into which a threaded end 67 of the adjustment rod 70 is screwed, and an intermediate counterbore 69 is provided for a cylindrical mounting shaft portion 71 of the adjustment rod 70. A sealing cap 55 is threaded into the upper end of tube 44 and an adjustment knob 73, that is provided at the top end of adjustment rod 70, passes through a central opening in the sealing cap 55. To prevent leakage, while enabling rotation of the adjustment rod 70 via the adjustment knob 73, an 0-ring seal 75 is incorporated into the sealing cap 55.

The lower tube 46 being filled with hydraulic fluid, it can be appreciated that the upper tube 44 cannot telescope into the lower tube 46 without fluid 62 being able to travel from the lower tube 46, through the ports 64, into the chamber 57 of the upper tube 44. However, so long as the compressive forces (such as those due to pedaling forces) are low, the preload imposed by the spring 68 will prevent valve plate 66 from opening so that the suspension assemblies 40 will be locked and function in the manner of a rigid fork. Furthermore, the preload imposed by the spring 66 can be adjusted to compensate for a full variety of rider weights and abilities by turning of the adjustment knob 73 so as to thread the adjustment rod more or less into the opening 65 of the metering valve 60. In the referenced patent, a preload spring force of approxiimately 7 lbs. was applied on the valve plate 66 with the system depressurized using a 40 to 50 lbs./inch spring. With the adjustment rod 70, a 100 lb./in. spring can be used to which as much as 15-20 lbs. of preload can be applied, (so as to enable compression of the suspension assemblies 40 only under the most rigorous of circumstances and/or heaviest of riders; as much as 40 lbs. of force being required to blow open the valve plate 66) or the preload could be decreased to a minimal value that is just sufficient to avoid absorption of pedaling forces on smooth roads (for use by the lightest and most inexperienced of riders).

As in the suspension assembly of the referenced patent, the counterbore area 72 allows the build up of fluid pressure force under the valve plate 66 to be greater than that of the ports 64, themselves, to facilitate the creation of a dampening characteristic that has much greater resistance at low input compressive forces than under high input forces for enabling the system to be locked to prevent absorbing of rider pedaling energy while rapidly opening under impact effects. However, in the illustrated embodiment, the counterbore 72 also houses an expansion check valve 82 which replaces the ball type arrangement previously provided in a return port located in the center of the spring retaining shoulder bolt.

Check valve plate 82 (which can be in the form of a thin washer), under the influence of compressive forces, is pressed against the underside of valve plate 66 by fluid attempting to exit the lower tube 46 via the ports 64. On the other hand, upon extension of the telescoping tubes 44, 46, the fluid medium 62 is able to enter the return port 80 and displace the check valve plate 82 out of its sealing position. In this regard, while the washer-like plate 82 can be permitted to simply float within the counterbore 72, preferably a thin wavy washer type spring is disposed between the check valve plate 82 and the bottom wall of the counterbore 72 so as to eliminate the effect of the check valve plate 82 having to, first, be displaced into its port-closing position during compression. If the preferred wavy-spring is utilized in conjunction with the check valve plate 82, it should have only enough strength to support the check valve plate 82 and should not affect the ability of viscous fluid 62 to shift the check valve plate 82 away from the port(s) 80 during extension. As an alternative, a very thin leaf spring could be mounted to the underside of the valve plate 66 instead of utilizing a check valve plate 82; however, such is not preferred for manufacturing reasons.

Also, as was done with the inventor's prior arrangement, the telescoping assemblies 40 are pressurized with air through an air valve to extend the system after it has been compressed and to provide a further ability to compensate for different rider weights or riding conditions. However, in this case, the air valve 90 is an elastomeric needle valve of the type commonly found on inflatable athletic balls, such as basketballs and footballs, and is incorporated into the adjustment knob 73 of the adjustment rod 70. In this regard, it can be seen from FIG. 3 that a needle insertion space 91 is formed into an upper end of the adjustment knob 73 and has an enlarged area 93 into which the elastomeric needle valve 90 can be snapped. Needle insertion space 91 communicates with chamber 57 through an air inlet port 95 at the bottom side of the adjustment knob 73.

Turning now to FIGS. 4–7, the improved cross member of the present invention will now be described. In the applicant's referenced patent, a cross member is provided between the two lower telescoping tubes to prevent the tubes from becoming skewed when the fork is loaded torsionally. That is, the cross member does not allow a twisting or rotating motion of the suspension assemblies at its attachment. Also, the rim brakes are mounted at the areas of connection between the cross member and lower tubes, thereby minimizing their influence by locating them at the strongest point of the lower tubes and, additionally, avoiding the need to provide a separate attachment means for the rim brakes. In the same way, in the illustrated preferred embodiment, a U-shaped cross member 48 is connected to the lower telescoping tubes 46 using a pair of bolts that mount through a pair of bolt hole bosses 47, 49 that are formed at the lower ends of legs 48L of cross member 48. Furthermore, the inner bosses 47, simultaneously, serve for mounting of the rim brakes 24 and can be provided with a flange 47a having a plurality of holes which can, selectively, be utilized to fix the end of a return spring of the brake device, as is conventional with bicycle wheel rim brakes.

However, it has been subsequently discovered, after further research and testing, that torsional forces placed on the fork, between the handlebars 32 and the front wheel 21 are not the only significant forces affecting the rigidity of a telescoping front wheel suspension. In particular, it has been determined that side loading forces, occurring while cornering or while the rider is climbing hills out of the saddle ("jamming") tend to cause the individual telescoping assemblies 40 to move independently of each other, resulting in adverse handling effects. Furthermore, it has been determined that, while a U-shaped cross member formed of a simple round tube will eliminate the effects of the torsional forces, a cross member of such a shape will not adequately cope with the noted side loading forces. More specifically, analysis of the side loading forces by the inventor has shown that a bending load is placed on the straight leg portions 48L of the U-shaped cross member 48 which a round tube cross section is not best suited to resist. On the other hand, a round cross section is best suited for resisting torsional forces, which the inventor has found to be concentrated in the U-bend portion 48B of the cross member 48. On the basis of this research and analysis, the new cross member 48, which is described relative to FIGS. 4–7, below, has been created.

The cross member 48 is formed of a cast metal part of a compound cross-sectional shape that is best suited for resisting all of the forces to which the front fork wheel suspension 10 will be subjected in use. As can be seen in FIG. 4A, the U-bend portion 48B is a solid rod of circular cross section, except for the provision of the mounting flat 48M (FIGS. 4 and 4B) upon which the brake cable stop 26 is mounted. However, in the area where the leg portions 48L merge into the U-bend portion 48B, the cross section of the cross member 48 undergoes a transformation from a round shape into the essentially square hollow cross-sectional shape shown in FIG. 4C, after which it flares outwardly into the larger rectangular hollow cross-sectional shape apparent from FIG. 5. From FIG. 4, it can be seen that the enlargement of the cross section of the legs 48L, from the square cross section of FIG. 4C to the rectangular cross section of FIG. 5, is produced solely through the flaring of the outer side wall of the straight leg portions 48L, the inner wall remaining essentially vertical.

Figure 6A:
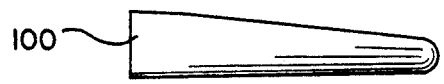
FIGS. 6A–6C are schematic views of a core for use in producing a hollow within the legs of the cross member of FIG. 4.
Figure 6B:
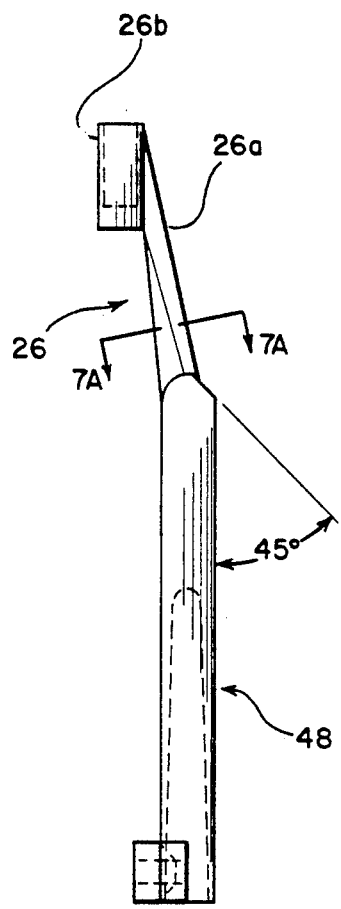
Figure 6B:
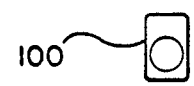
Figure 6C:
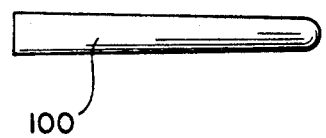

By way of example, the flaring of the outer wall surface will produce an angle $\alpha$ of approximately 3.2°, and a U-bend portion 48B of approximately 0.55 inch diameter will blend into a square cross section with 0.55 inch long sides, and with the flaring resulting in a rectangular cross section that is about 0.55 inch by approximately 0.65 inch. Additionally, as a weight reducing measure, during the casting process for producing cross member 48, cores are utilized to render the straight leg portions 48L hollow, as represented by the broken lines in FIG. 4 and as can be seen from the views of FIGS. 4C and 5. FIGS. 6A–6C schematically depict the shape of a core which can be used for this purpose, and it is apparent from these figures that the core 100 is designed to produce a gradual reduction in the thickness of the outwardly flaring wall of the straight leg portion 48L while maintaining an essentially uniform wall thickness on the other three sides (although, a slight degree of taper is provided to the core at these sides simply to facilitate removal of the core from the finished cross member). The nominal thickness of the wall of the hollow portion of the cross member will be approximatel 0.05 inch at line C—C in FIG. 4. Tests with such a cross member have shown a dramatic increase in fork stiffness and improvement in handling characteristics.

Figure 7:
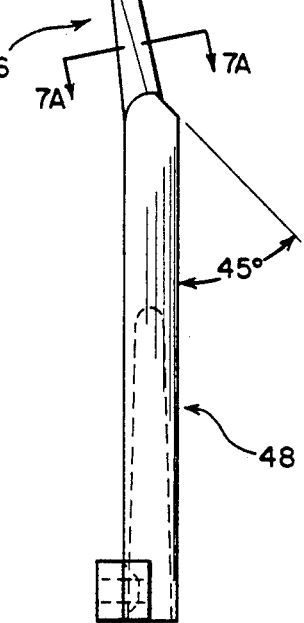
FIG. 7 is an enlarged side elevational view of the cross member shown in FIG. 4.
Figure 8:
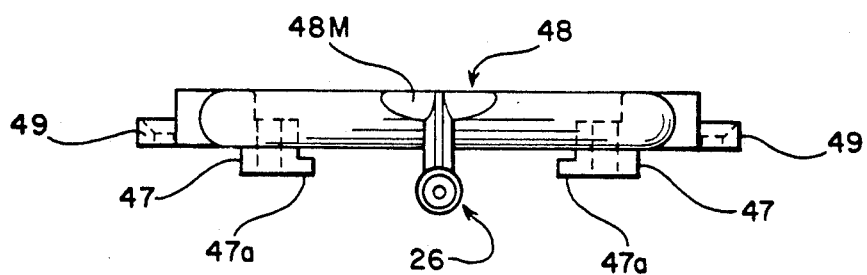
FIG. 8 is a top view of the cross member shown in FIG. 4.

As can be seen from FIGS. 7-8, the cable stop 26 is attached to the mounting area 48M at the top of cross member 48 and is comprised of a strut 26a and a cable stop receptacle 26b. The strut 26a slopes forwardly so that the cable stop receptacle 26b is oriented vertically with its center disposed approximately 0.9 inches forwardly of the apex of the U-bend portion, as viewed in FIG. 7.

From the foregoing, it should now be apparent how the present invention is able to achieve all of its initially stated objects, and more, so as to result in a bicycle front fork wheel suspension that is improved both with respect to versatility, strength, and handling performance without departing or detracting from the basic concepts and benefits associated with that of the inventor's earlier patent. Furthermore, while the present invention has been shown and described with reference to a specific preferred embodiment, it will be understood by those skilled in the art that various alterations and modifications in form and detail can be made within the scope of the present invention. For example, while the present invention shows the cross member 48 as being utilized in conjunction with the inventive hydraulic shock absorbing assemblies 40, it should be apparent that the benefits of this cross member can be achieved with any and all types of telescopic front fork shock absorbing assemblies whether utilizing hydraulic, elastomeric or spring damping mechanisms. Accordingly, the present invention is not intended to be limited to the specific details shown and described herein and encompasses the full scope of the appended claims.

I claim:

1. A front fork wheel suspension for a bicycle comprising a pair of suspension assemblies, each of which comprises an upper and a lower telescoping tube, the upper tubes of the suspension assemblies being connected by a crown member carrying a steering tube, and the lower telescoping tubes being connected by a U-shaped cross member; wherein the U-shaped cross member has a U-bend portion of a circular cross-sectional shape for resisting torsional forces acting to twist or rotate the suspension assemblies, and having straight leg portions of a rectangular cross section for resisting side loading forces acting to cause the suspension assemblies to move independently of each other.

2. A front fork wheel suspension according to claim 1, wherein the circular cross section of the U-bend portion blends into a square cross-sectional shape at a top end of the straight leg portions and elongates into a rectangular cross-sectional shape toward a bottom end thereof.

3. A front fork wheel suspension in accordance with claim 2, wherein said straight leg portions are hollow and said U-bend portion is solid.

4. A front fork wheel suspension assembly according to claim 3, wherein mounting bosses are provided on a lower end of the cross member, said bosses having bolt holes for mounting of the cross member and a bicycle rim brake to the lower tubes of the suspension assemblies.

5. A front fork wheel suspension assembly according to claim 1, wherein mounting bosses are provided on a lower end of the cross member, said bosses having bolt holes for mounting of the cross member and a bicycle rim brake to the lower tubes of the suspension assemblies.

6. Front fork wheel suspension assembly according to claim 5, wherein a brake cable stop extends upwardly and forwardly from a top end of the U-shaped cross member.

7. In a pedal driven bicycle having a handlebar, a frame and a front fork with a wheel suspension of the type having a pair of telescoping suspension assemblies, each of which is disposed on a respective leg of the front fork, the improvement wherein each of the telescoping suspension assemblies has a fluid containing circuit for controlling compression of the telescoping suspension assembly, said fluid containing circuit means including a means for preventing pedal drive energy absorption by locking the suspension assemblies against compression by resisting low input forces imposed upon the fork, via the handlebar and frame of the bicycle, as a result of a pedaling action of a rider of the bicycle and for enabling compression of the suspension assemblies for absorption of impact shocks imposed upon the front fork by a wheel carried thereby by reacting under the effect of high input forces; wherein each said suspension assembly includes an upper telescoping tube and a lower telescoping tube, said telescoping tubes being configured such that one said telescoping tube is axially, slidably engaged within the other of said telescoping tubes; wherein said fluid circuit means comprises a fluid-holding chamber having a portion within each of said tubes, a viscous fluid being disposed within said chamber; a pressure responsive fluid valve means disposed within said chamber for metering fluid flow from one of said tubes to the other of said tubes upon axial sliding movement of said tubes relative to one another, said valve having a normally closed position and opening under pressure forces that are greater than those created by pedaling and which correspond to those created by wheel impact shocks; and means for adjusting the pressure forces required to open said valve as a means for compensating for different rider weights, rider abilities, and riding conditions.

8. A wheel suspension in accordance with claim 7, wherein said chamber is partially filled with a quantity of said viscous fluid; wherein an air space is located above the viscous fluid within said chamber; and wherein means for pressurizing said air space is provided.

9. A wheel suspension in accordance with claim 7, wherein said valve means includes a valve body and at least one port formed through said valve body to permit said fluid to flow through said body from the portion of the chamber in one tube to the portion of the chamber in the other tube; wherein a displaceable valve plate is spring loaded into a position in which the valve plate is disposed across said at least one port to block fluid from passing through said at least one port unless sufficient fluid pressure exists to overcome the spring force on said plate; and wherein the means for adjusting comprises a means for varying the preload of a spring provided for producing the spring loading of the valve plate.

10. A wheel suspension in accordance with claim 9, wherein an adjustment rod is provided having a top end sealingly projecting through a top end of the upper telescoping tube and a lower end that is threaded into said valve body, with an intermediate portion of the adjustment rod passing through said spring and said valve plate; wherein said spring is held between said valve plate and a shoulder formed on said adjustment rod; and wherein means for turning the adjustment rod is provided in its top end, whereby said adjustment rod can be threaded into and out of said valve body so as to vary the preloading of said spring.

11. A wheel suspension in accordance with claim 10, wherein said chamber is partially filled with a quantity of said viscous fluid; wherein an air space is located above the viscous fluid within said chamber; and wherein means for pressurizing said air space is provided.

12. A wheel suspension according to claim 11, said means for pressurizing is provided in a top end portion of the adjustment rod.

13. A wheel suspension according to claim 12, wherein said means for pressurizing comprises an inflation needle insertion passage with an elastomeric needle valve body therein and an air inlet passage communicating said needle insertion passage with said fluid-holding chamber.

14. A wheel suspension according to claim 7, wherein the upper tubes of the suspension assemblies are connected by a crown member carrying a steering tube, and the lower telescoping tubes are connected by a U-shaped cross member; wherein the U-shaped cross member has a U-bend portion of a circular cross-sectional shape for resisting torsional forces acting to twist or rotate the suspension assemblies, and having straight leg portions of a rectangular cross section for resisting side loading forces acting to cause the suspension assemblies to move independently of each other.

15. A wheel suspension according to claim 14, wherein the circular cross section of the U-bend portion blends into a square cross-sectional shape at a top end of the straight leg portions and elongates into a rectangular cross-sectional shape toward a bottom end thereof.

16. A wheel suspension according to claim 15, wherein the straight leg portions are hollow and said U-bend portion is solid.

17. A wheel suspension according to claim 16, wherein mounting bosses are provided on a lower end of the cross member, said bosses having bolt holes for mounting of the cross member and a bicycle rim brake to the lower tubes of the suspension assemblies.

18. A wheel suspension according to claim 14, wherein mounting bosses are provided on a lower end of the cross member, said bosses having bolt holes for mounting of the cross member and a bicycle rim brake to the lower tubes of the suspension assemblies.

19. A wheel suspension according to claim 18, wherein a brake cable stop extends upwardly and forwardly from a top end of the U-shaped cross member.

20. A wheel suspension according to claim 9, wherein a counterbore is located under said valve plate which is larger in area than said at least one port as a means for allowing a build-up of fluid pressure under the valve plate that is greater than that of the at least one port itself in a manner creating a damping characteristic that has a much greater resistance to low input compressive forces than to high input compressive forces; and wherein a one-way check valve plate is provided in said counterbore as a means for blocking flow through a return port formed in the valve plate and permitting a return fluid flow through the valve plate during extension of the suspension assemblies.

21. A front fork wheel suspension for a bicycle comprising a pair of suspension assemblies, each of which comprises an upper and a lower telescoping tube, the upper tubes of the suspension assemblies being connected by a crown member carrying a steering tube, and the lower telescoping tubes being connected by a U-shaped cross member; wherein the U-shaped cross member has a U-bend portion of a solid cross-sectional shape for resisting torsional forces acting to twist or rotate the suspension assemblies, and having straight leg portions of a hollow cross section for resisting side loading forces acting to cause the suspension assemblies to move independently of each other, said hollow cross section of the straight leg portions progressively increasing in a direction extending away from said U-bend portion.

* * * * *